(12) United States Patent
Su

(10) Patent No.: US 12,158,171 B2
(45) Date of Patent: Dec. 3, 2024

(54) HOOK

(71) Applicant: QUZHOU T-NINE TOOLS CO., LTD., Quzhou (CN)

(72) Inventor: John Su, Quzhou (CN)

(73) Assignee: QUZHOU T-NINE TOOLS CO., LTD., Quzhou (CN)

( * ) Notice: Subject to any disclaimer, the term of this patent is extended or adjusted under 35 U.S.C. 154(b) by 3 days.

(21) Appl. No.: 18/333,286

(22) Filed: Jun. 12, 2023

(65) Prior Publication Data
US 2023/0323907 A1 Oct. 12, 2023

(30) Foreign Application Priority Data

Feb. 28, 2023 (CN) .......................... 202310176031.1

(51) Int. Cl.
*F16B 19/08* (2006.01)
*F16B 45/00* (2006.01)

(52) U.S. Cl.
CPC ............ *F16B 19/08* (2013.01); *F16B 45/008* (2021.05); *F16B 2200/506* (2018.08)

(58) Field of Classification Search
CPC .. F16B 19/08; F16B 2200/506; F16B 45/008; A47G 29/087
USPC ........................................................ 248/304
See application file for complete search history.

(56) References Cited

U.S. PATENT DOCUMENTS

| 4,094,490 A | * | 6/1978 | Einhorn | A47G 1/20 411/443 |
| 6,250,597 B1 | * | 6/2001 | Kuo | A47K 10/10 248/231.91 |
| 8,191,845 B1 | * | 6/2012 | Yu | F16B 45/005 248/220.42 |
| 8,272,610 B2 | * | 9/2012 | Ernst | B25H 3/006 248/302 |
| 8,757,570 B2 | * | 6/2014 | Ernst | A47G 25/0607 248/223.41 |
| 8,800,212 B2 | * | 8/2014 | Thrush | A47F 5/0846 52/36.5 |
| 9,675,142 B1 | * | 6/2017 | Hendricks | A44B 13/0058 |

FOREIGN PATENT DOCUMENTS

| CN | 204670883 U | 9/2015 |
| CN | 204677580 U | 9/2015 |

* cited by examiner

*Primary Examiner* — Bradley Duckworth

(57) ABSTRACT

A hook includes a hook seat, a rivet, and a fixing bolt. A rivet cap and a rivet post are provided on the rivet. The rivet post includes a rivet rod and a rivet seat. A diameter of the rivet seat is greater than a diameter of the rivet rod. A first step is formed between the rivet rod and the rivet seat. A first cut surface and a second cut surface are provided on both sides of the rivet rod, respectively. The rivet and fixing bolt are matched with each other and fixed to the hook seat. The first step abuts against one side of the hook seat. An end face of the fixing bolt abuts against the other side of the hook seat to lock the hook seat between the fixing bolt and the first step.

10 Claims, 5 Drawing Sheets

HOOK

CROSS-REFERENCE TO RELATED APPLICATIONS

This application claims the benefit of priority from Chinese Patent Application No. 202310176031.1, filed on Feb. 28, 2023. The content of the aforementioned application, including any intervening amendments thereto, is incorporated herein by reference in its entirety.

TECHNICAL FIELD

This application relates to daily necessities, and more particularly to a hook.

BACKGROUND

Hooks are a class of elements widely used in our daily life for seeking and hanging objects. In most cases, the hooks are fixed on the wall with a sucker or a sticker. However, the sucker is only suitable for smooth wall surfaces, and the sticker-based attachment has a limited loading capacity. In view of this, the existing hooks are greatly limited in the practical application.

SUMMARY

An object of this application is to provide a hook, which can achieve a securer installation.

This application provides a hook, including:
a hook seat;
a rivet; and
a fixing bolt;
wherein the rivet is provided with a rivet cap and a rivet post; the rivet post includes a rivet rod and a rivet seat; the rivet rod and the rivet seat are cylindrical; a diameter of the rivet seat is greater than a diameter of the rivet rod; a first step is formed between the rivet rod and the rivet seat; and a first side of the rivet rod is provided with a first cut surface, and a second side of the rivet rod is provided with a second cut surface, thereby increasing an area of the first step; and the rivet and the fixing bolt are matched with each other and fixed to the hook seat; the first step abuts against a first side of the hook seat; and an end face of the fixing bolt abuts against a second side of the hook seat to lock the hook seat between the fixing bolt and the first step.

In an embodiment, the rivet post is fixedly provided at an upper end of the rivet cap; and a second step is formed between the rivet post and the rivet cap.

In an embodiment, the hook is provided with a double-hook mechanism; the double-hook mechanism is hooked; and a hook portion of the double-hook mechanism is provided with a protective sleeve which is made of an elastic material.

In an embodiment, a plurality of fixing points are provided on the second side of the hook seat; each of the plurality of fixing points is dome-shaped; and the plurality of fixing points are distributed in an arc.

In an embodiment, a distance between the hook seat and one side of the fixing point away from the hook seat is 1.5 mm.

In an embodiment, the double-hook mechanism is fixedly connected to the hook seat through the plurality of fixing points; the hook seat is provided with two positioning through holes; a maximum diameter of the rivet post is greater than a distance between the first cut surface and the second cut surface; and the first cut surface and the second cut surface respectively fit or abut against inner walls of the two positioning through holes.

In an embodiment, the hook seat is penetratedly provided with a positioning slot which is waist-shaped; and the positioning slot and the two positioning through holes are located in the same line.

In an embodiment, a rivet hole is penetratedly provided on a center of the rivet; and the rivet hole is in threaded connection with or in clearance fit with the fixing bolt.

In an embodiment, the fixing bolt includes a bolt cap and a bolt foot; and the rivet hole fits the bolt foot.

In an embodiment, a fixing base is provided between the hook seat and the rivet cap; the fixing base is provided with a fixing through hole; and the rivet post is penetratedly provided in the fixing through hole.

In an embodiment, the fixing base is further provided with an upper clamping slot and a lower clamping slot opposite to each other for fixing the hook.

Compared to the prior art, this application has the following beneficial effects.

The hook provided herein is provided with a rivet having two steps and two cut surfaces, which allows a larger contact area when the hook seat is fixed, to render the fixed connection more compact and firmer. The detachable fastener formed by the rivet and fixing bolt also makes the use of the hook more convenient.

The hook provided herein is provided with two positioning through holes and a positioning slot. When the distance between the fasteners is enough for the hook to use, the fasteners are set between the two positioning through holes. When the distance is insufficient, the distance can be adjusted through the positioning slot.

In the figures: 1—hook seat; 11—positioning through hole; 12—fixing point; 13—positioning slot; 2—rivet; 21—second step; 22—first step; 23—rivet cap; 24—rivet hole; 25—rivet post; 251—first cut surface; 252—second cut surface; 253—rivet rod; 254—rivet seat; 3—double-hook mechanism; 31—protective sleeve; 4—fixing bolt; 41—bolt cap; 42—bolt foot; 5—fixing base; 51—lower clamping slot; 52—upper clamping slot; and 53—fixing through hole.

DETAILED DESCRIPTION OF EMBODIMENTS

The disclosure will be described in detail below in conjunction with embodiments and accompanying drawings. These embodiments are merely to explain the disclosure, and not intended to limit the disclosure.

Embodiment 1

Referring to an embodiment shown in FIGS. 1-7, a hook assembly includes a hook seat 1, a rivet 2, a double-hook mechanism 3, and a fixing bolt 4. The double-hook mechanism 3 is fixed to the hook seat 1.

Figure 6:
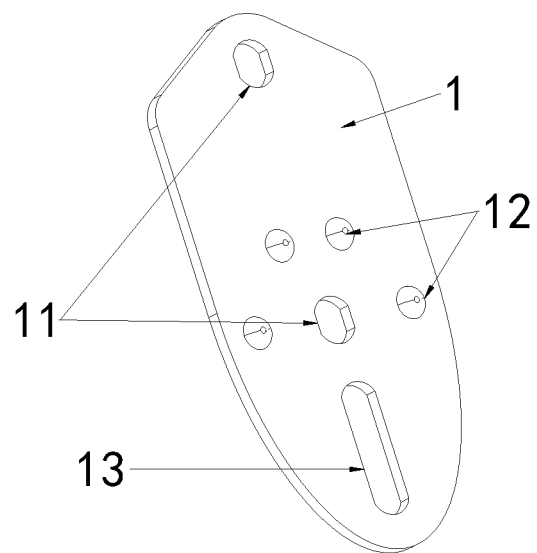
FIG. 6 is a schematic diagram of a hook seat according to an embodiment of the present disclosure.
Figure 7:
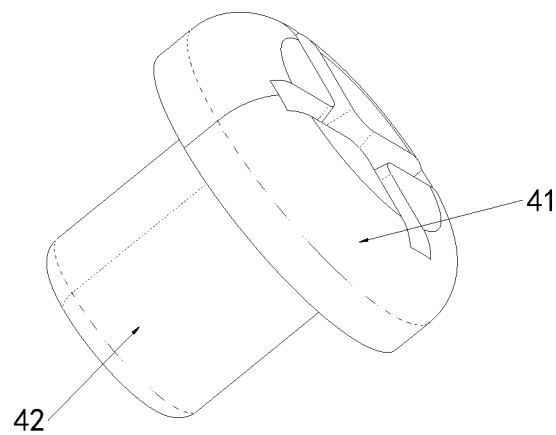
FIG. 7 is a schematic diagram of a fixing bolt according to an embodiment of the present disclosure.

As shown in FIG. 6, a plurality of fixing points 12 are provided on a second side of the hook seat 1. Each of the plurality of fixing points 12 is dome-shaped. The plurality of fixing points 12 are distributed in an arc. The distance between the hook seat 1 and one side of the fixing point 12 away from the hook seat 1 is 1.5 mm.

The double-hook mechanism 3 is fixedly connected to the hook seat 1 through the plurality of fixing points 12. The hook seat 1 is provided with two positioning through holes 11 which are respectively located on upper and lower sides of the plurality of fixing points 12. The positioning through hole 11 is waist-shaped, and the size of the positioning through hole 11 is matched with the rivet 2.

In this embodiment, the double-hook mechanism 3 is hooked. A hook portion of the double-hook mechanism 3 is provided with a protective sleeve 31 which is made of elastic material such as silicone and rubber.

Figure 1:
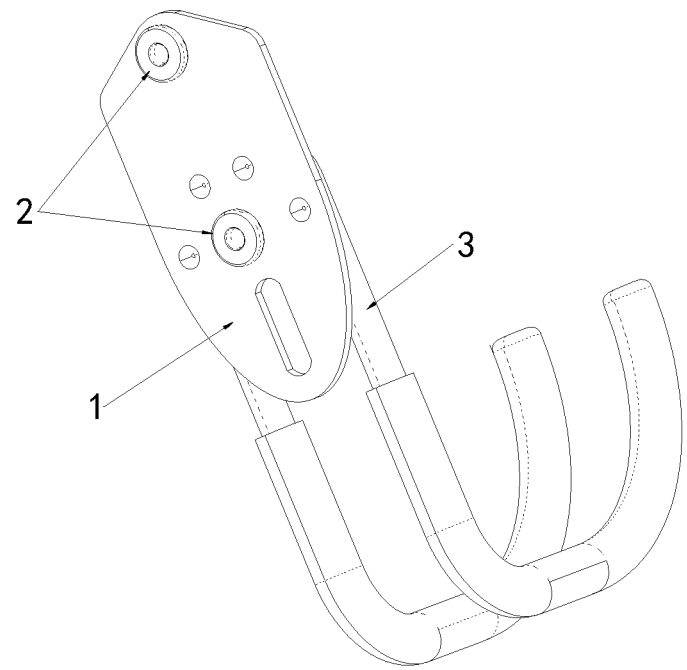
FIG. 1 is a first perspective view of a hook according to an embodiment of the present disclosure.
Figure 2:
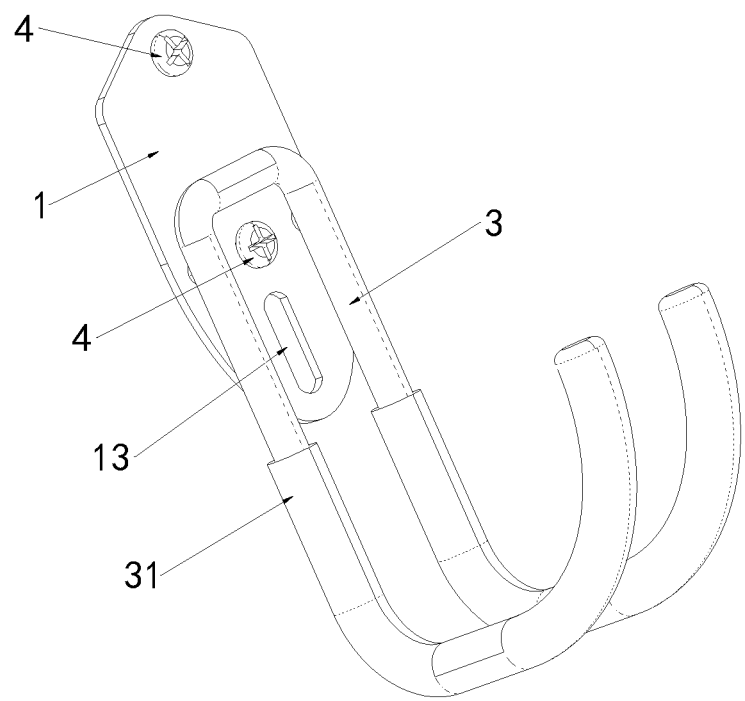
FIG. 2 is a second perspective view of the hook according to an embodiment of the present disclosure.
Figure 3:
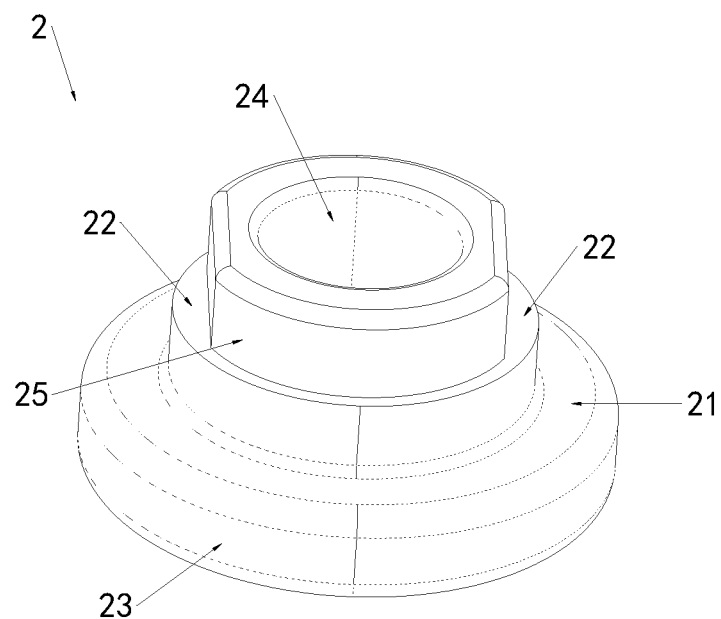
FIG. 3 is a first perspective view of a rivet according to an embodiment of the present disclosure.

As shown in FIG. 3, the rivet 2 is provided with a rivet cap 23 and a rivet post 25. The rivet post 25 is fixedly provided at the upper end of the rivet cap 23, and a second step 21 is formed between the rivet post 25 and the rivet cap 23.

Figure 4:
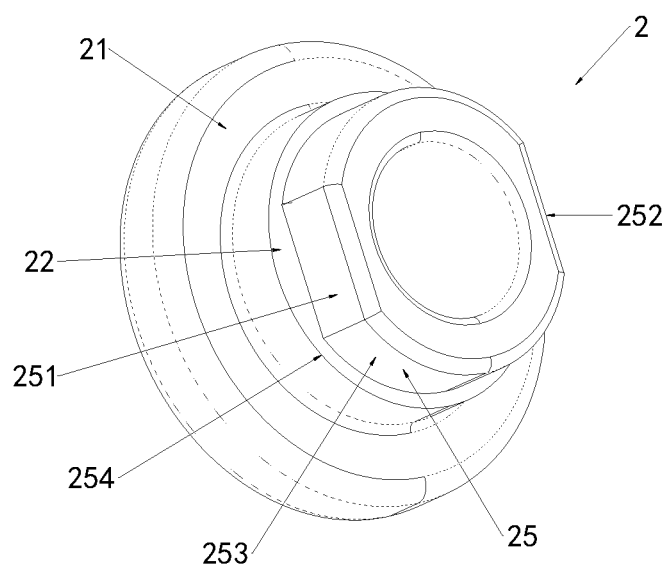
FIG. 4 is a second perspective view of the rivet according to an embodiment of the present disclosure.
Figure 5:
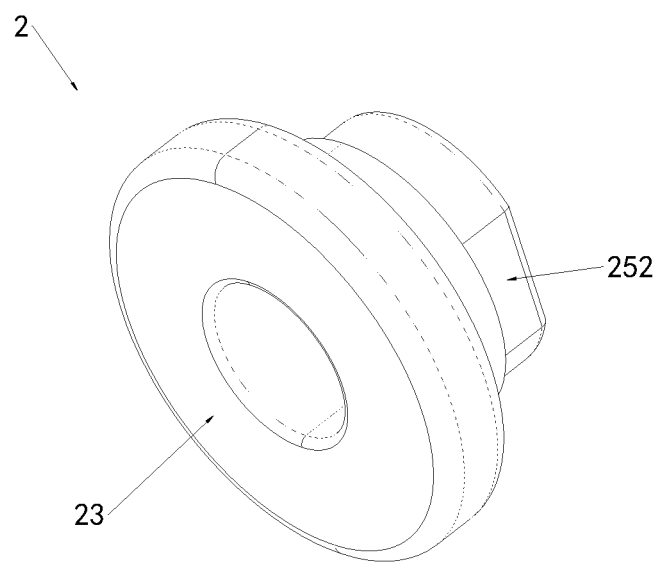
FIG. 5 is a third perspective view of the rivet according to an embodiment of the present disclosure.

As shown in FIG. 4, the rivet post 25 includes a rivet rod 253 and a rivet seat 254. The rivet rod 253 and the rivet seat 254 are cylindrical. The diameter of the rivet seat 254 is greater than that of the rivet rod 253. A first step 22 is formed between the rivet rod 253 and the rivet seat 254. A first side of the rivet rod 253 is provided with a first cut surface 251, and a second side of the rivet rod 253 is provided with a second cut surface 252, thereby increasing an area of the first step 22. A rivet hole 24 is penetratedly provided on a center of the rivet 2. The fixing bolt 4 includes a bolt cap 41 and a bolt foot 42. The rivet hole 24 fits the bolt foot 42. The bolt cap 41 and the rivet cap 23 are respectively on both sides of the hook seat 1, and the rivet hole 24 is in threaded connection with or in clearance fit with the bolt foot 42 to realize a detachable connection.

In this embodiment, the rivet post 25 of the rivet 2 is inserted into the positioning through hole 11. The diameter of the rivet post 25 is greater than the distance between the first cut surface 251 and the second cut surface 252. The first cut surface 251 and the second cut surface 252 of the rivet 2 respectively fit or abut against the inner walls of the positioning through holes 11. Such an arrangement, the rivet post 25 will not rotate in the positioning through hole 11. When the fixing bolt 4 is fixedly connected with the rivet 2, the fixed bolt 4 is directly operated without further fixing the rivet 2, making the fixing of the hook more convenient.

In this embodiment, the hook seat 1 is penetratedly provided with a positioning slot 13 which is waist-shaped. The positioning slot 13 and the two positioning through holes 11 are located in the same line. The length of the positioning slot 13 is longer than the positioning through hole 11, such that more than one rivet 2 can be accommodated in the positioning slot 13. As shown in FIG. 6, the positioning slot 13 is located below the two positioning through holes 11. The two fixing bolts 4 correspond to the two positioning through holes 11 to fix the hook seat 1 by two points, because the distance between the two positioning through holes 11 is constant, the positioning distance of the two fixing bolts 4 is also certain. The requirements for the positioning distance of the two points are small. When the positioning distance of the two points are not matched with the fixing distance between the two positioning through holes 11, user may change the distance between the two fixing bolts 4 by installing the two fixing bolts 4 into the positioning through hole 11 and the positioning slot 13, thereby fitting different positioning needs.

When the fastener formed by the rivet 2 and the fixing bolt 4 is installed on the hook seat 1, the two steps and two cut surfaces on the rivet 2 increase the contact area when hook seat 1 is fixed, rendering fixed connection more compact and firmer.

Embodiment 2

Figure 8:
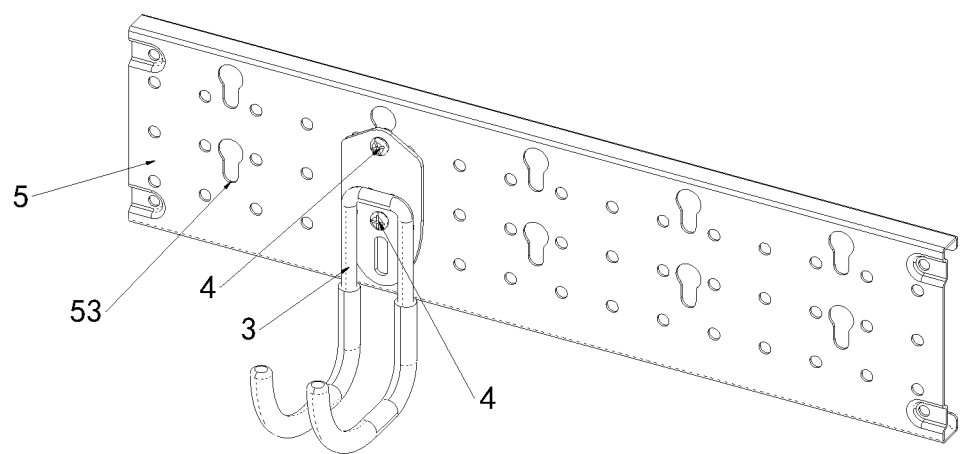
FIG. 8 is a first perspective view of a hook with a fixing base according to an embodiment of the present disclosure.
Figure 9:
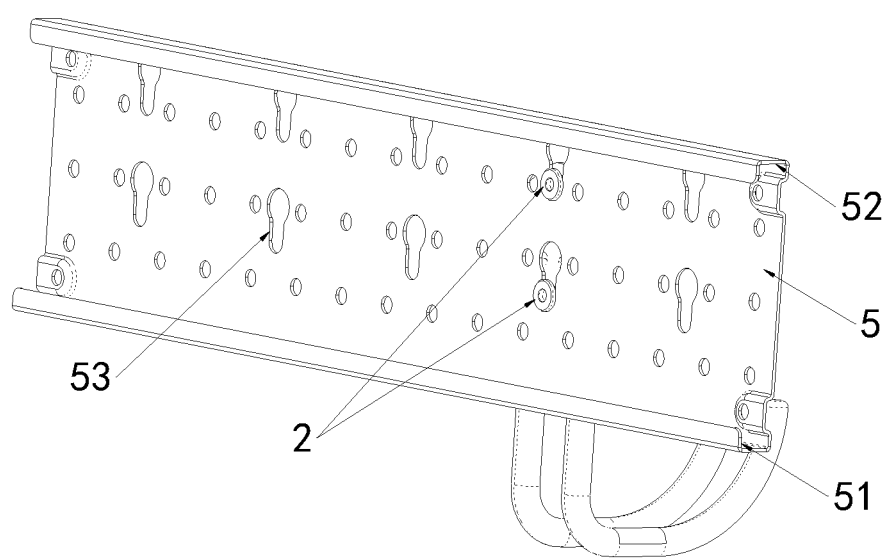
FIG. 9 is a second perspective view of the hook with a fixing base according to an embodiment of the present disclosure.

The differences from Embodiment 1 are described as follows. Referring to FIGS. 8-9, a fixing base 5 is provided between the hook seat 1 and the rivet cap 23. The fixing base 5 is further provided with a lower clamping slot 51, an upper clamping slot 52, and a fixing through hole 53. Specifically, the lower clamping slot 51 and the upper clamping slot 52 are respectively located on the upper and lower ends of the fixing base 5. The rivet post 25 is inserted into the fixing through hole 53. The second step 21 of the rivet 2 abuts against the side of the fixing base 5 away from the hook seat 1. The first step 22 of the rivet 2 abuts against the side of the hook seat 1 away from the fixing bolt 4.

In this embodiment, the fixing through hole 53 is a combination of a waist-shaped part and a circle-shaped part. The diameter of the circle-shaped part is greater than the diameter of the waist-shaped part. The rivet seat 254 of the rivet 2 is inserted into the fixing through hole 53 from the circle-shaped part with the large diameter, and then slides into the waist-shaped part with the small diameter. In this way, it is convenient for inserting the rivet 2 into the fixing base 5. Specifically, the outer circumference of the rivet seat 254 fits the thickness of the fixing base 5, and the outer circumference of the rivet rod 253 fits the thickness of the hook seat 1. The bolt foot 42 gradually penetrates the rivet hole 24, and the rivet cap 23 and the bolt cap 42 clamps and positions the fixing base 5 and the hook seat 1, thereby forming more firm and stable positioning.

As shown in FIG. 9, the lower clamping slot 51 is disposed at the lower end of the fixing base 5 away from the second side of the hook seat 1. The upper clamping slot 52 is disposed at the upper end of the fixing base 5 away from the second side of the hook seat 1. The lower clamping slot 51 and the upper clamping slot 52 are provided opposite to each other. The lower clamping slot 51 and the upper clamping slot 52 are used to fix an object in the usage environment.

In this embodiment, the fixing through holes 53 are arranged on the fixing base 5 in pairs and in rows. The fixing base 5 corresponds to a plurality of the fasteners and the hook seat 1. Several different objects can be suspended at the same time to meet the user's needs.

Described above are merely preferred embodiments of the disclosure, which are not intended to limit the disclosure. It should be understood that any modifications and replacements made by those skilled in the art without departing from the spirit of the disclosure should fall within the scope of the disclosure defined by the present claims.

What is claimed is:

1. A hook, comprising:
   a hook seat;
   a rivet; and
   a fixing bolt;
   wherein the rivet is provided with a rivet cap and a rivet post; the rivet post comprises a rivet rod and a rivet seat; a diameter of the rivet seat is greater than a diameter of the rivet rod; a first step is formed between the rivet rod and the rivet seat; and a first side of the rivet rod is provided with a first cut surface, and a second side of the rivet rod is provided with a second cut surface, thereby increasing an area of the first step; and
   the rivet and the fixing bolt are connected with each other and fixed to the hook seat; the first step abuts against a first side of the hook seat; and an end face of the fixing bolt abuts against a second side of the hook seat to lock the hook seat between the fixing bolt and the first step.

2. The hook of claim 1, wherein the rivet post is fixedly provided at an upper end of the rivet cap; and a second step is formed between the rivet post and the rivet cap.

3. The hook of claim 1, wherein the hook is provided with a double-hook mechanism; the double-hook mechanism is hook-shaped; and a hook portion of the double-hook mechanism is provided with a protective sleeve which is made of an elastic material.

4. The hook of claim 3, wherein a plurality of fixing points are provided on the second side of the hook seat; each of the plurality of fixing points is dome-shaped; and the plurality of fixing points are distributed in an arc.

5. The hook of claim 4, wherein the double-hook mechanism is fixedly connected to the hook seat through the plurality of fixing points; the hook seat is provided with two positioning through holes; a maximum diameter of the rivet post is greater than a distance between the first cut surface and the second cut surface; and the first cut surface and the second cut surface respectively fit or abut against inner walls of the two positioning through holes.

6. The hook of claim 5, wherein the hook seat is penetratedly provided with a positioning slot which is oval-shaped; and the positioning slot and the two positioning through holes are located in the same line.

7. The hook of claim 1, wherein a rivet hole is penetratedly provided on a center of the rivet; and the rivet hole is in threaded connection with or in clearance fit with the fixing bolt.

8. The hook of claim 7, wherein the fixing bolt comprises a bolt cap and a bolt foot; and the rivet hole fits the bolt foot.

9. The hook of claim 1, wherein a fixing base is provided between the hook seat and the rivet cap; the fixing base is provided with a fixing through hole; and the rivet post is penetratedly provided in the fixing through hole.

10. The hook of claim 9, wherein the fixing base is further provided with an upper clamping slot and a lower clamping slot opposite to each other for fixing the hook.

* * * * *